S. S. HOWELL.
MEANS FOR SEPARATING MIXTURES.
APPLICATION FILED NOV. 4, 1918.
1,355,477. Patented Oct. 12, 1920.
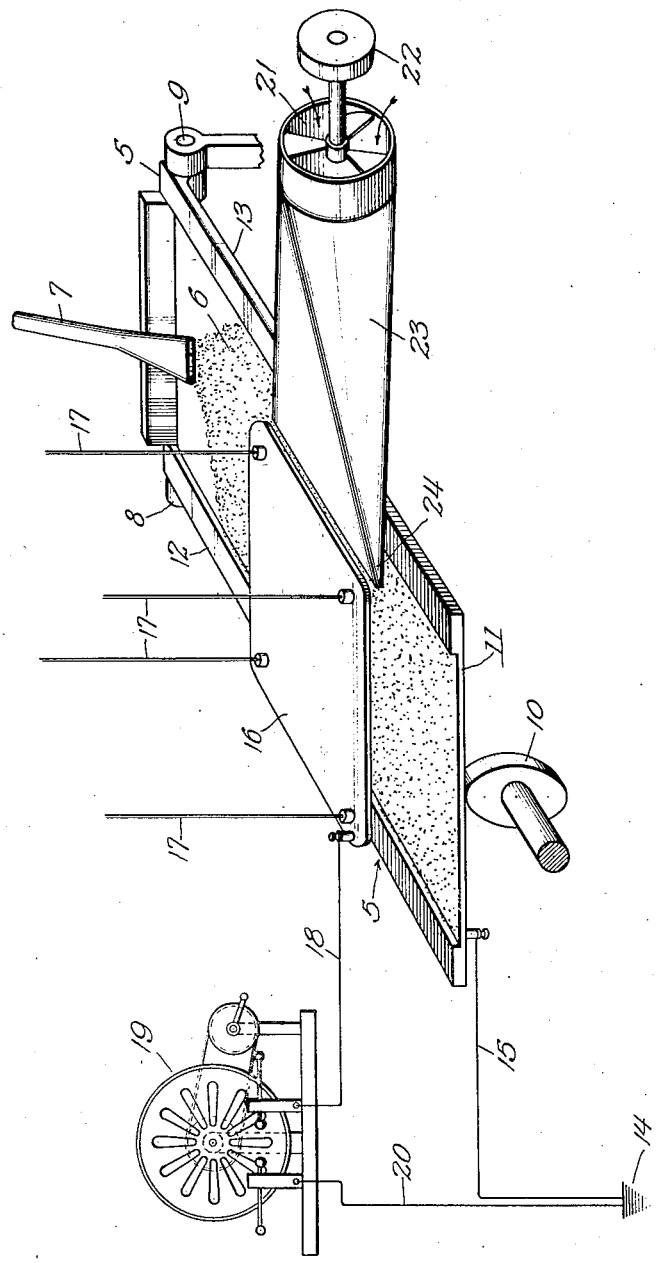

UNITED STATES PATENT OFFICE.

SYLVESTER S. HOWELL, OF CHICAGO, ILLINOIS, ASSIGNOR TO UNITED CHEMICAL & ORGANIC PRODUCTS CO., OF CHICAGO, ILLINOIS, A CORPORATION OF DELAWARE.

MEANS FOR SEPARATING MIXTURES.

1,355,477.     Specification of Letters Patent.     Patented Oct. 12, 1920.

Application filed November 4, 1918. Serial No. 260,964.

*To all whom it may concern:*

Be it known that I, SYLVESTER S. HOWELL, a citizen of the United States, residing at Chicago, in the county of Cook and State of Illinois, have invented certain new and useful Improvements in Means for Separating Mixtures, of which the following is a specification.

My invention relates to the method of and means for separating components of undesirable mixtures of material particles.

One of the objects of my invention is to provide a method of procedure and means for separating components of undesirable mixtures of material particles, such for example as glumes, hulls, chaff, flaky metal, wood particles and the like, from grain, cereals, ground or otherwise divided products of various sorts, of other valuable commodities.

One of the especial objects of my invention is to separate undesirable adulterants, that may be electro-statically influenced and that may be contained in comminuted gelatin, glue, or the like, in the process of its manufacture, from the more desirable product, thereby to purify it and enhance its commercial value and increase its worth as a food or adherescent.

Other and further objects of my invention will become readily apparent to persons skilled in the art, from a consideration of the following description when taken in conjunction with the accompanying drawing.

In the accompanying drawing forming a part hereof, I have shown a conventional arrangement of devices for carrying my invention into effect, wherein 5 is an apron upon which the comminuted material 6 is received from the pipe or conduit 7. The apron may be pivoted as at 8 and 9 and it is vibrated by impact of the rotatable cam 10 for the purpose of agitating the material as it flows over the apron. The apron is preferably inclined from its receiving end 9 to its discharge end 11, from which the material passes into a suitable receptacle. The apron is composed, preferably, of a sheet of material, such for example as iron or steel, having side members 12 and 13 to form a shallow trough. The apron is preferably electrically connected to the ground 14, as by a wire 15. Superposed above the apron, near its upper surface is a plate 16, supported by suitable means, such for example as silk cords or rubber rods 17. The plate is connected by wire 18 to a suitable electric source, such for example as an electro-static machine, 19, and the machine is connected by wire 20 to the ground 14 or directly to the plate 5.

A fan or blower 21, driven by a shaft and pulley 22, sends a draft of air through the nozzle 23 across the space intervening between the plates 11 and 16 and through the electro-static field. The nozzle is preferably flattened at its discharge end, as at 24, so as to evenly distribute the blast of air.

The plates are maintained electro-statically charged, at relatively high difference of potential, of relatively opposite polarity, by rotation of the inductor member of the electro-static machine.

As the material passes over the top surface of the plate 5, it becomes electro-statically charged and a stress is exerted upon it to lift it up into contact with the upper plate 16. The effect, however, is not sufficient to lift all of the material, but the more susceptible material to be rid of is lifted into the intermediate space between the two plates, or into contact with the upper plate, whereupon the draft of air from the nozzle 23, being greater in effect than the attraction of the particles for the plate above, will blow the objectionable particles away. The constant agitation of the apron 5, by the cam 10, or otherwise, operates to liberate the attracted particles that may be held by the unattracted particles to permit them to be lifted from the apron plate 5, and furthermore, the agitation accelerates the gravitational effect of the material in its passage down the apron.

The coöperative effect of agitation, polarization and pneumatic disturbance produces a very satisfactory and efficient method of procedure in accomplishing the object sought, as hereinbefore disclosed.

Having described my invention, what I claim is:—

1. The art of separating components of undesirable mixtures of material particles, which consists in spreading the particles out in a relatively thin, inclined, wide area; producing an electro-static field, above said area; agitating the particles while in the field, by rapidly vibrating them in a vertical path, and while being vibrated, subjecting them to the effect of gravity, to move them progressively at substantially right angles to their vibrating movement and directing a current of air through the field, at substantially right angles to both movements of the particles to blow the lighter attracted particles away.

2. An apparatus having in combination a vibratory support inclined and pivoted at one end; means to rapidly vibrate said support in a vertical direction; an electrostatic charge receiving surface above the support substantially parallel with said support; means to electro-statically charge said surface and means to direct a current of air through the electro-static field in substantially a parallel path with the operative surface of said support to blow away the lighter attracted particles.

In testimony whereof I hereunto subscribe my name.

SYLVESTER S. HOWELL.